June 21, 1955 — E. C. DALE, JR — 2,710,966
EYE SHADE
Filed May 26, 1953
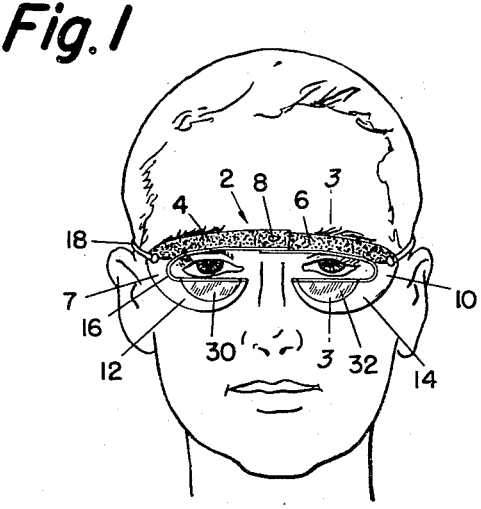
Fig. 1
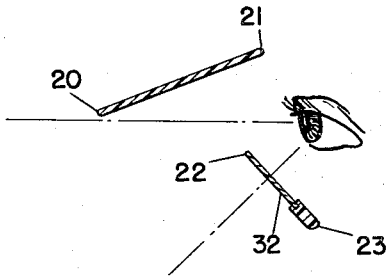
Fig. 3
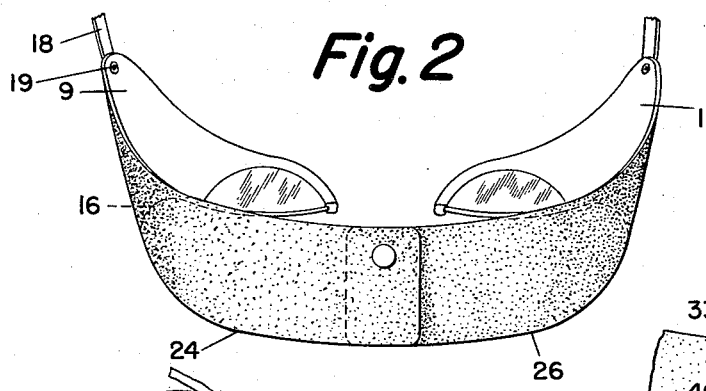
Fig. 2
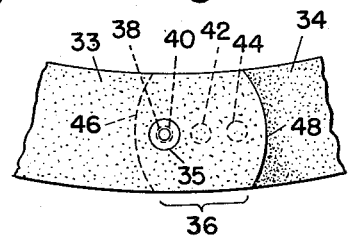
Fig. 4
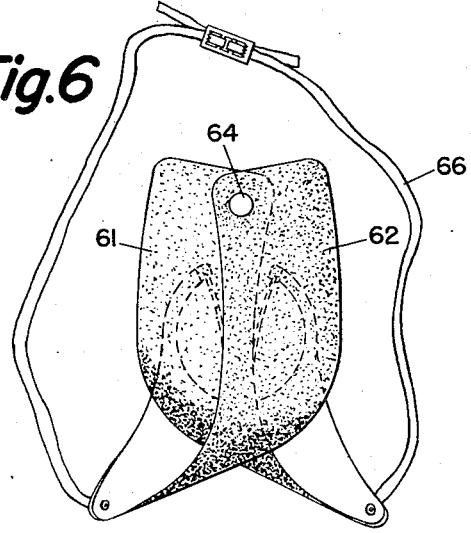
Fig. 6
Fig. 5
INVENTOR.
EDWARD C. DALE, JR.
BY Bruno, Smith & Harding
ATTORNEYS

United States Patent Office 2,710,966
Patented June 21, 1955

2,710,966

EYE SHADE

Edward C. Dale, Jr., St. Croix, V. I.

Application May 26, 1953, Serial No. 357,470

6 Claims. (Cl. 2—12)

This invention relates to an improvement in anti-glare eye protectors or eye shades and is an improvement on the eye shade disclosed in my copending patent application Serial No. 217,505, filed March 26, 1951, now Patent No. 2,645,774, issued July 21, 1953.

It is well known that the human eye suffers various adverse effects from prolonged exposure to extremely bright sunlight or reflected sunlight such as occurs from the surface of water, sand, etc.

The conventional means of protecting the eye from sun glare is to provide a lens or other suitable covering of a tinted or polarized material which will filter out a portion of the light rays and prevent them from reaching the eye. This type of anti-glare protector has numerous obvious disadvantages. For example, there is usually involved the openings between the lens and the face of the wearer, and if closure members are provided, they obstruct the vision of the wearer. Furthermore, the tinted lens provides a distortion of the natural color and will effect the visual clarity or perception of, particularly, distant objects.

Various types of lensless eye shields or shades have been suggested heretofore, but these shades all involve various disadvantages, including inadequate protection of the eye, restriction or confinement of the range of vision to a limited degree on horizontal plane because of the side member or blinders which are usually involved in such shades.

It is an object of the present invention to provide an eye shade which will cut down the amount of light reaching the eye of the wearer and will effectively shield the eyes of the wearer from the direct rays of sunlight and from rays of sunlight which are reflected upwardly or downwardly from relatively nearby objects or from the earth, water, or low lying relatively nearby clouds in the sky.

It is a further object of this invention to provide the wearer with an eye shade which will not restrict the wearer's spread of horizontal vision, i. e., will permit unobstructed vision when the wearer turns his eyes from one side to the other.

It is a further object of this invention to provide an eyeshade which simultaneously will permit unrestricted vision of distant object or objects viewed by the wearer generally horizontally from the wearer's eye, will permit the wearer to look directly downwardly at the ground adjacent to the wearer's feet with a minimum of obstruction to vision, and will provide an appreciable filtering of light reaching the wearer's eyes from the ground at an intermediate distance from the wearer's position to previously mentioned horizontal objects.

It is a still further object of the invention to provide an eye shade, having the characteristics reviewed above, which will be adjustable to fit against the face of any wearer and which includes, in the portion thereof through which the wearer views objects below the normal horizontal line of vision, shade members having specially selected optical characteristics.

These and other objects of the invention will become apparent when read in conjunction with the accompanying drawing in which:

Figure 1 is a showing of the eye shade as it is worn;
Figure 2 is a plan view of the eye shade;
Figure 3 is a diagrammatic showing of a section of the shade taken on the trace 3—3 of Figure 1 showing the physical and angular relations between portions of the shade, and those portions of the shade and eye of the wearer;
Figure 4 is a fragmentary showing of the upper portion of the shade showing a modification of the shade shown in Figure 2;
Figure 5 is a modification of the portion of the shade shown in Figure 4; and
Figure 6 is a plan view of the eye shade showing the shade in a folded position.

The shade comprises an upper shade indicated generally at 2 which is adapted to fit across the wearer's face and engage the head immediately below the eyebrows of the wearer. This portion of the shade may be opaque, translucent or of smoked, tinted or polarized material suitable to effectively shield the eyes and is preferably of dull non-reflectant finish on its underside.

The upper shade is formed of two pieces 4 and 6 pivotally connected together at a pivot 8 adapted to be positioned midway between the eyes of the wearer.

Each of the upper shade portions 4 and 6 extend sidewardly and have downwardly turned portions 7 and 10. The portions 7 and 10 include rearwardly extending portions 9 and 11 which engage the side of the wearer's face to the side of and behind the eyes. The lower portions of the sideward portions 7 and 10 are turned inwardly and extend across under the eye of the wearer to form the lower shades 12 and 14. The lower shades are preferably adapted to engage the wearer's face below the eyes and are of reducing width as they extend inwardly toward the wearer's nose and terminate adjacent to the nose.

The front edges 16 of the side portions 7 and 10 of the eye shade are cut back toward the wearer's face sufficiently so as not to interfere with the cross or side vision of the wearer. It will be noted that there is a complete absence of any obstruction to the cross vision of the wearer adjacent to his nose.

Each of the halves of the shade comprising sections 4, 7 and 12 and comprising sections 6, 10 and 14 are preferably molded from a single piece of material such as, for example, a suitable plastic material, and are of such a thickness as to provide sufficient rigidity that the desired relationships between the upper and lower shade members are retained.

The shade may be attached to the wearer's head by means of conventionally formed ear engaging members 18 which may be hingedly connected to the eye shade by means of screws or other suitable mounting pins 19. Alternatively, there may be provided a suitable head band or strip to mount the shade to the head of the wearer.

As previously noted, the upper shade is preferably of opaque or translucent material. The lower shades are preferably transparent though tinted or otherwise treated to filter light in its passage therethrough. The transparent lower shades are provided to permit the wearer to look downwardly and see, for example, objects in the path of his walking with relatively unobstructed vision.

The relative positions of the outer edges of the upper and lower shades, as indicated at 20 and 22 in Figure 3 is of particular importance. The upper shade is directed outwardly and downwardly from the wearer's face as previously described. The center portion of the upper shade in the region between the numerals 24 and 26 in Figure 2 is provided with a slight upward bow but is so formed as to have its outer edge 20 positioned to provide a generally horizontal shielding line which establishes a horizontal shade in that region. The lower shades 12 and 14 which are of reducing width as they extend toward the nose are directed upwardly from their line of contact with the wearer's face and terminate in edges 22 which are formed to provide substantially horizontal shading below the eyes as shown in Figure 1.

Thus there is provided between the upper and lower shades a slit-like opening having for the center portion of its length what appears to the wearer to be substantially parallel edges and having its end portions merged together and joining in curved side portions previously described. The outer curved upper and lower shield joining portions are spaced outwardly or sidewardly from the wearer's eyes and the forward or outer edges 16 thereof are spaced backwardly sufficiently to permit substantially unobstructed side vision to the degree normally employed and as previously described.

As shown in Figure 3, the outer edge 22 of the lower shade terminates sufficiently to the rear or inwardly of the outer edge 20 of the upper shade to permit the bright rays of light passing generally downwardly toward the viewer from passing under the upper shade and reflecting upon the upper surface of the lower shade and into the eye of the viewer.

Each of the lower shades 12 and 14 is provided with a generally semicircular insert 30 and 32, respectively. These inserts may be of flat form or may be slightly curved if desired.

In the molding processes most economically used for the production of an eye shade such as disclosed herein, it is difficult to provide transparent lower shade portions which do not distort the light rays passing therethrough and thus which do not distort vision therethrough. If elaborate molding processes which include careful selection of materials and annealing after molding are employed, these portions of the shade may be made relatively true and of such a nature as to not distort vision therethrough. I have found, however, that it is more economical to provide inserts, such as lens inserts 30 and 32, which are selected from optically true materials so that the wearer in looking downwardly through these inserts, for example, in reading, does not have his vision distorted.

It should additionally be noted that many persons require optical corrections to permit them to read. For persons of this type, these inserts 30 and 32 may be ground optical lenses so formed as to provide the necessary visual correction to the wearer, the inserts being in the nature of the bifocal insert commonly known in spectacles. Thus in this eye shade the inserts may be either of such a nature as to provide no distortion to the vision of the wearer therethrough, or alternatively, to provide correction as is necessary by a prescribed lens to improve the vision of the wearer. The inserts may be set in recesses, may be cemented or may be otherwise secured in position in the lower shade in any manner known to the art.

As previously described, the center pin 8 shown in Figures 1 and 2 is provided in order to insure the snug fit of the rear edges 21 of the upper shade against the face of the wearer in order that light does not pass between the shade and the wearer's head. In eye shades in which the inserts 30 and 32 are in the form of a vision correcting lens, it is necessary that these lenses be maintained in proper plane alignment and extreme pivoting at pin 8 would so distort this alignment as to provide discomfort to the wearer. Accordingly, the provision is made as illustrated in Figures 4 and 5 for adjusting the spread of the eye shade as well as for adjusting the pivotal relation between the two halves of the shade.

In Figure 4 there is shown fragmentary portions of two upper shades 33 and 34, which overlap in the region indicated at 36. The upper shade portion 33 is provided with a bore 38 extending therethrough. The upper shade portion 34 is provided with three bores 40, 42 and 44 extending therethrough. These four bores are all placed on a line extending generally through the center portion of the upper shades. In the positions shown, the bores 40 and 38 are in alignment with each other and a suitable fastening means 35 is extended therethrough in order to retain the upper and lower shades in their proper relative positions. It will be evident that if the bore 38 in the upper shade 33 is positioned in alignment with the bore 42 in the shade 34, the shades will be drawn together and thus will be adjusted to fit a more narrow face. The bores 38, 40, 42 and 44 are so arranged with respect to the edges 46 and 48 of the overlapping portions of the shades that regardless of which holes in the shade 34 are positioned in alignment with the hole in the shade 33, light will not pass through any of the other holes in the shade 34.

In Figure 5 there is shown an arrangement for accomplishing adjustment between upper shade portions 50 and 52 which overlap in the region indicated by the numeral 54. The shade 50 is provided with a diagonally extending slot 56 and the shade 52 is provided with a diagonally extending slot 58 which extends substantially at right angles to the slot 56. The point at which these slots cross provides a passage through the two shades and permits the insertion of a suitable fastening means 60 which may be of such a nature as to draw the shades together and by the force of friction retain them in any desired alignment. It will be evident that, as the two shades are moved together, the point of crossing of the two slots will be displaced and, similarly, as the two shades are drawn apart, a point of cross will be displaced. However, in any relative positions of the two shades within the extremes permitted by the lengths of the slots, the two shades may be locked together by means of the fastening means 60.

By adjusting means such as described in conjunction with Figures 4 and 5, the width of the shade and, to a degree, the curvature of the rear edge of the shade may be adjusted to fit the face of almost any wearer without unduly displacing the insert lenses 30 and 32 from the necessary plane alignment which would be required in the event that these were ground lenses providing the wearer with a prescribed visual correction.

In Figure 6 there is shown a pair of shades in which the upper shade portions 61 and 62 are pivoted together at 64 and in which the shades have been folded with the upper portions of the shades drawn forwardly and together around a pivot 64 to provide a compact package for carrying. The shade shown in Figure 6 is provided with an elastic band 66 to secure the shade to the head of the wearer. The advantage in the provision of the band is that it is more readily folded into a package of minimum size which may be conveniently carried in a pocket. However, the shade shown in Figures 1 and 2 having ear engaging members 18 may be similarly folded and will occupy only slightly more space when folded.

When the word "lens" is employed herein, it is employed to mean either a refracting or a non-refracting lens. Thus the term is applied interchangeably to a non-distorting insert and to an insert ground or otherwise formed to provide an optical correction. While the pivoted structure is preferably employed in connection with the lens inserts when the lenses are of a corrective nature in order to insure the proper alignment of the lenses, it will be evident that the lenses may be employed without the pivoted structure and, alternatively, the pivoted connection or the pivoted connection providing lateral adjustment may be employed to advantage, for example, to improve the fit of the eye shade against the head, without simultaneously employing the lens inserts.

What is claimed is:

1. An eye shade comprising a pair of shade elements each comprising an upper shade portion formed to fit against the face of the wearer and to extend forwardly and downwardly from the face above an eye and terminating slightly above the normal horizontal line of vision, a lower shade portion adapted to fit against the face and formed to extend forwardly and upwardly therefrom terminating slightly below the normal horizontal line of vision and a side shade portion joining said upper and lower shade portions, means pivotally connecting the two upper shade portions, said connecting means including means providing lateral width adjustment of the eye shade, a lens inserted in each of said lower shade portions, and means for supporting the shade in position against the face of the wearer.

2. An eye shade comprising an upper shade adapted to fit against the face of the wearer, the upper shade including two shade portions pivotally connected together in the region central to the wearer's face and being formed to extend forwardly and downwardly from the face above the eyes and terminating slightly above the normal horizontal line of vision, lower shades one under each eye adapted to fit against the face and formed to extend forwardly and upwardly therefrom and terminating slightly below the normal horizontal line of vision, the lower shades each being supported solely by its associated upper shade portion through shade side portions and each being of reducing width as they extend toward the wearer's nose and terminating adjacent to the nose, the forward edges of the lower shades terminating back of and below the forward edge of the upper shade to be shaded thereby, and means for supporting the shade in position against the face of the wearer.

3. An eye shade comprising an upper shade adapted to fit against the face of the wearer, the upper shade including two shade portions pivotally connected together in the region central to the wearer's face and being formed to extend forwardly and downwardly from the face above the eyes and terminating slightly above the normal horizontal line of vision, lower shades one under each eye adapted to fit against the face and formed to extend forwardly and upwardly therefrom and terminating slightly below the normal horizontal line of vision, the lower shades each being of reducing width as they extend toward the wearer's nose and terminating adjacent to the nose, the forward edges of the lower shades terminating back of and below the forward edge of the upper shade to be shaded thereby, the upper and lower shade portions coming together at their extreme sideward portions, and means for supporting the shade in position against the face of the wearer, the pivotal connection including means providing lateral width adjustment of the eye shade.

4. An eye shade comprising a substantially rigid molded plastic shade element including an upper shade portion formed to fit against the face of the wearer and to extend forwardly and downwardly from the face above an eye and terminating slightly above the normal horizontal line of vision, a lower shade portion adapted to fit against the face and formed to extend forwardly and upwardly therefrom terminating slightly below the normal horizontal line of vision, a side shade portion joining said upper and lower shades, an optically clear lens inserted in said lower shade portion in a position adapted to be before the eye of the wearer, and means for supporting the shade in position against the face of the wearer.

5. An eye shade comprising a pair of substantially rigid molded plastic shade elements each comprising an upper shade portion formed to fit against the face of the wearer and to extend forwardly and downwardly from the face above an eye and terminating slightly above the normal horizontal line of vision, a lower shade portion adapted to fit against the face and formed to extend forwardly and upwardly therefrom terminating slightly below the normal horizontal line of vision and a side shade portion joining said upper and lower shade portions, the lower shade portions each extending substantially to the nose of the wearer and being entirely supported by its associated side shade portion, means pivotally connecting the two upper shade portions, and means for supporting the shade in position against the face of the wearer.

6. An eye shade comprising a pair of substantially rigid molded plastic shade elements each comprising an upper shade portion formed to fit against the face of the wearer and to extend forwardly and downwardly from the face above an eye and terminating slightly above the normal horizontal line of vision, a lower shade portion adapted to fit against the face and formed to extend forwardly and upwardly therefrom terminating slightly below the normal horizontal line of vision and a side shade portion joining said upper and lower shade portions, the lower shade portions each extending substantially to the nose of the wearer and being entirely supported by its associated side shade portion, means pivotally connecting the two upper shade portions, an optically clear lens inserted in each of said lower shade portions in a position adapted to be before the eyes of the wearer, and means for supporting the shade in position against the face of the wearer.

References Cited in the file of this patent

UNITED STATES PATENTS

| Number | Name | Date |
|---|---|---|
| 951,473 | Ellis | Mar. 8, 1910 |
| 1,198,337 | Folsom | Sept. 12, 1916 |
| 2,545,078 | Gardner | Mar. 13, 1951 |
| 2,556,433 | Mitchell | June 12, 1951 |
| 2,645,774 | Dale | July 21, 1953 |